United States Patent Office 3,808,220
Patented Apr. 30, 1974

3,808,220
PRODUCTION OF HYDROXY-HALOGENO-PYRIDINES OR SALTS THEREOF
Roy Dennis Bowden, Maurice Berkeley Green, and Geoffrey Teasdale Brown, Runcorn, England, assignors to Imperial Chemical Industries Limited, London, England
No Drawing. Filed May 17, 1971, Ser. No. 144,288
Claims priority, application Great Britain, June 30, 1970, 31,583/70
Int. Cl. C07d 31/30
U.S. Cl. 260—297 R       15 Claims

ABSTRACT OF THE DISCLOSURE

Process for the manufacture of a 2-hydroxy- or a 4-hydroxy-halogenopyridine salt, which comprises the step of reacting in a non-hydroxylic solvent: (1) a halogenopyridine comprising a fluoro-, chloro- or fluorochloropyridine having a chlorine or fluorine atom in one or both of the 2- and 4-positions of the pyridine ring with (2) a metal carboxylate.

---

This invention relates to the production of hydroxy-halogenopyridines or salts thereof.

It is known that salts of hydroxy-halogenopyridines may be prepared by alkaline hydrolysis of fluoropyridines, chloropyridines or fluorochloropyridines. Thus, for example, an alkali-metal salt of 3,5-dichloro-2,6-difluoro-4-hydroxypyridine may be obtained by hydrolysis of 3,5-dichlorotrifluoropyridine with an alkali-metal hydroxide; 3,5-dichloro-2,6-difluoro-4-hydroxypyridine may then be obtained from the alkali-metal salt by treatment with an acid.

We have found that salts of certain 2-hydroxy- or 4-hydroxy-halogenopyridines may conveniently be prepared by reacting the appropriate halogenopyridine starting material with a metal carboxylate in a non-hydroxylic solvent.

Thus according to the present invention there is provided a process for the production of a 2-hydroxy- or 4-hydroxy-halogenopyridine (or a salt thereof) which comprises the step of reacting in a non-hydroxylic solvent (i) a halogenopyridine comprising a fluoro-, chloro- or fluorochloropyridine having a chlorine or a fluorine atom in one or both of the 2- and 4-positions of the pyridine ring with (ii) a metal carboxylate.

Suitable fluoropyridines which may be used as starting materials include pentafluoropyridine; suitable chloropyridine starting materials include pentachloropyridine; and suitable fluorochloropyridines include 3,5-dichlorotrifluoropyridine, 3-chloro-tetrafluoropyridine and 2-fluoro-tetrachloropyridine.

The process described herein is especially advantageous for the preparation of 3,5-dichloro-2,6-difluoro-4-hydroxypyridine or salts thereof. Known methods of preparation of 3,5-dichloro-2,6-difluoro-4-hydroxypyridine via alkaline hydrolysis of 3,5-dichlorotrifluoropyridine have the disadvantage of yielding as by-product a substantial proportion of the isomeric 2-hydroxy compound (or the corresponding pyridone) arising from displacement of the fluorine atom in the 2-position of the pyridine ring: the process described herein favors the formation of the salt of 3,5-dichloro-2,6-difluoro-4-hydroxypyridine, from which 3,5-dichloro-2,6-difluoro-4-hydroxypyridine itself may be obtained in relatively high yield upon treatment with an acid.

The metal carboxylates which may be used include in particular the salts of aliphatic carboxylic acids (for example alkanoic acids, and especially those of up to six carbon atoms, for example acetic acid), though the salts of other carboxylic acids, including aromatic carboxylic acids, for example benzoic acid, may also be used. The metal of the metal carboxylate is most conveniently an alkali metal, for example sodium or potassium. In general it is preferred to use an alkali metal acetate, potassium acetate being the most preferred. Mixtures of metal carboxylates can be used if desired.

When the starting material is a fluoropyridine or fluorochloropyridine having a fluorine atom in one or both of the 2- and 4-positions of the pyridine ring, another product of the reaction is the acid fluoride corresponding to the carboxylate employed. In many cases the acid fluoride is relatively volatile and can readily be removed from the product mixture, thereby leaving the salt of the desired hydroxy-halogenopyridine in a relatively pure state. This embodiment of the present invention has the further advantage of providing a convenient route to acid fluorides which are not readily prepared from other starting materials.

Thus according to another aspect of the present invention there is provided a process for the production of a 2-hydroxy- or 4-hydroxy-halogenopyridine (or a salt thereof) which comprises reacting in a non-hydroxylic solvent (i) a halogenopyridine comprising a fluoro- or fluorochloro-pyridine having a fluorine atom in one or both of the 2- and 4-positions of the pyridine ring and (ii) a metal carboxylate, wherein the acid fluoride corresponding to the metal carboxylate is recovered from the reaction products.

The process is especially applicable in the preparation of acid fluorides containing two or more carbon atoms in the molecule: when a formate is employed as the carboxylate the formyl fluoride produced may be at least partly decomposed under the reaction conditions.

Suitable non-hydroxylic solvents include amides, for example dimethyl formamide, dimethyl acetamide, diethyl acetamide, hexamethyl phosphoramide; ketones, for example acetone, cyclohexanone, N-methylpyrrolidone; nitro compounds, for example nitrobenzene, nitromethane; nitriles, for example acetonitrile, benzonitrile; pyridine compounds, for example pyridine, pyridine N-oxide; sulphoxides, for example dimethyl sulphoxide; sulphones, for example tetramethylene sulphone; ethers, for example dimethylether of diethylene glycol; alkyl carbonates, for example ethylene carbonate; and inorganic anhydrides, for example sulphur dioxide. Mixtures of solvents may be used if desired.

The reaction may be carried out under substantially anhyrous conditions. Alternatively, the reaction mixture may contain water, for example by using an aqueous non-hydroxylic solvent containing up to 45 percent by volume of water, but under these conditions the acid fluoride is not isolated.

The process may be carried out over a wide temperature range depending on the particular solvent employed but it is conveniently carried out at the boiling point of the reaction mixture.

The proportion of metal carboxylate is preferably at least 1 mole, for example from 1 to 3 moles, per mole of halogenated aromatic compound starting material.

The direct product of the process described herein is the metal salt of the hydroxy-halogenopyridine. The free hydroxy-halogenopyridine may be obtained, for example, by hydrolyzing the metal salt with water or an aqueous solution of an acid.

The free hydroxy-halogenopyridine may be converted into a salt which may be the same as or different from the salt which comprises the initial product of the process of the invention.

Fluoro- and chloro- 4-hydroxypyridines and salts thereof, for example 3,5-dichloro-2,6-difluoro-4-hydroxypyridine and salts thereof, belong to a class of compounds having useful herbicidal properties (as described in the specification of our U.K. Pat. No. 1,161,491).

The invention is illustrated but not limited by the following examples.

EXAMPLES 1–23

The metal carboxylate (0.075 mole), the halogenopyridine (0.05 mole), and the non-hydroxylic solvent (44 ml.) were heated with vigorous stirring under the conditions shown in the accompanying table. The reaction mixture was cooled to room temperature and acidified with dilute hydrochloric acid. The products were analyzed by gas-liquid chromatography. The yield of hydroxy-halogenopyridines and the molar ratio of 4-hydroxy-halogenopyridine to 2-hydroxy-halogenopyridine are shown in the table.

The yield of acid fluoride (where measured) is also shown in the table.

Key to solvents:
A=Dimethyl formamide
B=Dimethyl sulphoxide
C=Dimethyl acetamide
D=Tetramethyl sulphone
E=Nitrobenzene
F=Acetonitrile
G=Acetone
H=Aqueous tetramethylene sulphone (45% by volume water)
I=Aqueous acetone (45% by volume water)
J=Aqueous acetone (24% by volume water)
K=Dimethyl formamide/acetic anhyride (50% volume/volume)
L=N-methylpyrrolidone Key to percent yield of acid fluorides
N.D. means "not determined."

of 3,5-dichloro-2,6-difluoro-4-hydroxypyridine (corresponding to a crude yield of 57.5%).

The molar ratio of 4-hydroxy/2-hydroxy-halogenopyridine was 1.64:1.

EXAMPLE 25

Example 24 was repeated using a mixture of 3,5-dichlorotrifluoropyridine (40 g.), sodium hydroxide (16 g.) and water (400 ml.).

The crude products obtained and their yields were as follows:

|  | Percent |
|---|---|
| Unchanged starting material | 2.5 |
| 3,5-dichloro-4,6-difluoro-2-hydroxypyridine | 37.5 |
| 3,5-dichloro-2,6-difluoro-4-hydroxypyridine | 56.0 |

The molar ratio of 4-hydroxy/2-hydroxy-halogenopyridine was 1.5:1.

What we claim is:
1. A process for the production of a 2-hydroxy- or a 4-hydroxy-halogenopyridine salt, which comprises the step of reacting in a liquid medium containing a non-hydroxylic solvent (i) the corresponding fluoro-, chloro- or fluorochloro-halogenopyridine having a chlorine or fluorine atom in one or both of the 2- and 4-positions of the pyridine ring with (ii) an alkali metal carboxylate of an alkanoic acid of up to 6 carbon atoms or benzoic acid.

2. A process as claimed in claim 1 wherein an halogenopyridine starting material is a fluoro- or fluorochloro-pyridine having a fluoride atom in one or both of the 2- and 4-positions of the pyridine ring and wherein an acid fluoride corresponding to the metal carboxylate is recovered from the reaction products.

3. A process as claimed in claim 1 wherein the halogenopyridine is 3,5-dichlorotrifluoropyridine.

TABLE

| Ex. | Halopyridine | Metal carboxylate | Solvent | Temp. (°C.) | Time (min.) | Hydroxy-halogeno-pyridines (percent yield) | 4-hydroxy/2-hydroxy-halogeno-pyridine (molar ratio) | Acid fluoride (percent yield) |
|---|---|---|---|---|---|---|---|---|
| 1 | 3,5-dichlorotrifluoropyridine | Potassium acetate | A | 140 | 2 | 99 | 13 | N.D. |
| 2 |  |  | B | 140 | 2 | 97 | 14 | >60. |
| 3 |  |  | C | 140 | 2 | 96 | 11 | >60. |
| 4 |  |  | D | 140 | 1,440 | 97 | 100 | >60. |
| 5 |  |  | A | 100 | 2 | 96 | 21 | >60. |
| 6 |  |  | A | 25 | 60 | 95 | 80 | >60. |
| 7 |  |  | E | 100 | 5 | 86 | 80 | >60. |
| 8 |  |  | F | 82 | 150 | 69 | 32 | >60. |
| 9 |  |  | G | 56 | 120 | 97 | 17 | >60. |
| 10 |  |  | H | 100 | 120 | 87 | 11 | N.D. |
| 11 |  |  | D | 100 | 180 | 100 | 26 | N.D. |
| 12 |  |  | D | 30 | 120 | 84 | 15 | >60. |
| 13 |  |  | H | 30 | 120 | 92 | N.D. | N.D. |
| 14 |  |  | I | 56 | 120 | 98 | 14 | N.D. |
| 15 |  |  | J | 56 | 300 | 98 | 16 | N.D. |
| 16 | do | Sodium acetate | K | 140 | 90 | 89 | 7 | N.D. |
| 17 | Pentafluoropyridine | Potassium acetate | G | 56 | 360 | 52 | 100 | 72. |
| 18 | 3-chloro-tetrafluoropyridine | do | G | 56 | 1080 | 84 | 100 | 45. |
| 19 | 2-fluoro-tetrachloropyridine | do | G | 56 | 240 | 35 | N.D. | 67. |
| 20 | 3,5-dichlorotrifluoropyridine | Potassium formate | D | 100 | 180 | 96 | 21 | N.D. |
| 21 |  |  | G | 56 | 420 | 89 | N.D. | N.D. |
| 22 | do | Potassium benzoate | L | 140 | 12 | 84 | N.D. | 44. |
| 23 | Pentachloropyridine | Potassium acetate | A | 153 | 120 | 78 | 100 | Nil. |

EXAMPLE 24

By way of comparison, the alkaline hydrolysis of 3,5-dichlorotrifluoropyridine was carried out as follows.

A mixture of 3,5-dichlorotrifluoropyridine (20.2 g.), potassium hydride (11.2 g.) and water (200 ml.) was stirred under reflux for 6.5 hours. The mixture was cooled to room temperature and filtered to separate an oily product (1.1 g.; corresponding to 5.5% of the starting material). The residual filtrate was acidified with hydrochloric acid to a pH of 2.5 and the precipitated solid was filtered off and dried to give a solid (7 g.) consisting mainly of 3,5-dichloro-4,6-difluoro-2-hydroxypyridine (corresponding to 35% crude yield).

The filtrate was further acidified with hydrochloric acid to a pH of 1.0 and then extracted with ether. Evaporation of the ether gave a solid (11.5 g.) consisting mainly 4. A process as claimed in claim 1 wherein the halogenopyridine is pentafluoropyridine.

5. A process as claimed in claim 1 wherein the halogenopyridine is 3-chloro-tetrafluoropyridine.

6. A process as claimed in claim 1 wherein the halogenopyridine is 2-fluoro-tetrachloropyridine.

7. A process as claimed in claim 1 wherein the halogenopyridine is pentachloropyridine.

8. A process as claimed in claim 1 wherein the metal carboxylate is an acetate.

9. A process as claimed in claim 8 wherein the metal carboxylate is potassium acetate.

10. A process as claimed in claim 1 wherein the metal carboxylate is potassium benzoate.

11. A process as claimed in claim 1 wherein the reaction is carried out in the presence of water.

12. A process as claimed in claim 1 wherein the proportion of metal carboxylate is at least one mole per mole of halogenopyridine starting material.

13. A process as claimed in claim 12 wherein there is used from one to three moles of metal carboxylate per mole of halogenopyridine.

14. A process for the production of a 2-hydroxy- or 4-hydroxy-halogenopyridine which comprises hydrolyzing with water or acidifying the metal salt produced by the process claimed in claim 1.

15. A process as claimed in claim 14, wherein the 2-hydroxy- or 4-hydroxy-halogenopyridine is subsequently converted into a salt which is the same or a different metal salt from that initially produced in the process.

References Cited

Roberts et al.: Basic Principles of Organic Chemistry, Benjamin Inc., pp. 561–62 (1965).

Noller: Chemistry of Organic Compounds, Saunders Co., 2nd ed. 1957.

Fieser and Fieser: Advanced Organic Chemistry, Reinhold Publishing Co., p. 376 (1961).

ALAN L. ROTMAN, Primary Examiner